(12) United States Patent
Wang et al.

(10) Patent No.: US 10,097,878 B2
(45) Date of Patent: Oct. 9, 2018

(54) VIDEO PLAYBACK METHOD AND CONTROL TERMINAL THEREOF

(71) Applicant: MediaTek Singapore Pte. Ltd., Singapore (SG)

(72) Inventors: Longfei Wang, Hefei (CN); Yao-Chuang Ding, Hefei (CN); Yong-Zhi Gao, Hefei (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/492,455

(22) Filed: Apr. 20, 2017

(65) Prior Publication Data
US 2017/0318323 A1 Nov. 2, 2017

(30) Foreign Application Priority Data
Apr. 29, 2016 (CN) .......................... 2016 1 0281312

(51) Int. Cl.
| | |
|---|---|
| *H04N 5/765* | (2006.01) |
| *H04N 21/43* | (2011.01) |
| *H04N 21/8547* | (2011.01) |
| *H04N 5/04* | (2006.01) |
| *H04N 19/44* | (2014.01) |
| *H04N 19/172* | (2014.01) |
| *H04N 19/105* | (2014.01) |
| *H04N 19/132* | (2014.01) |

(52) U.S. Cl.
CPC ........... *H04N 21/4302* (2013.01); *H04N 5/04* (2013.01); *H04N 19/105* (2014.11); *H04N 19/132* (2014.11); *H04N 19/172* (2014.11); *H04N 19/44* (2014.11); *H04N 21/8547* (2013.01)

(58) Field of Classification Search
CPC ... H04N 21/8547; H04N 19/44; H04N 19/132
USPC ........................................................ 386/200
See application file for complete search history.

(56) References Cited

U.S. PATENT DOCUMENTS

| 6,674,803 B1 * | 1/2004 | Kesselring ....... H04N 21/23608 |
| | | 375/240.26 |
| 8,995,536 B2 * | 3/2015 | Subramanian ... H04N 21/44004 |
| | | 375/240.25 |

FOREIGN PATENT DOCUMENTS

CN   102572611 A   7/2012

* cited by examiner

*Primary Examiner* — Thai Tran
*Assistant Examiner* — Jose Mesa
(74) *Attorney, Agent, or Firm* — McClure, Qualey & Rodack, LLP

(57) ABSTRACT

Video playback method and control terminal thereof are provided. The invention receives video data stream, determines if a to-be-decoded frame meets a discard condition according to the time stamp of the to-be-decoded frame, if the discard condition is met, discards the non-reference frame to be decoded in the video data stream, and if the discard condition is not met, decodes the to-be-decoded frame into to-be-output frame; determines if the to-be-output frame meets the discard condition according to the time stamp of the to-be-output frame; if the discard condition is met, discards the to-be-output frame; if the discard condition is not met, outputs the to-be-output frame as output frame, such that the time intervals of the time stamps of the sequentially output frames according to the display order are equal.

20 Claims, 10 Drawing Sheets

VIDEO PLAYBACK METHOD AND CONTROL TERMINAL THEREOF

CROSS REFERENCE TO RELATED APPLICATIONS

This Application claims priority of China Patent Application No. 201610281312.3, filed on Apr. 29, 2016, the entirety of which is incorporated by reference herein.

BACKGROUND OF THE INVENTION

Field of the Invention

The invention generally relates to video encoding and decoding technology, and more particularly, to a video playback method and control terminal using the same.

Description of the Related Art

With the rapid development of multimedia technology, more and more high-definition and high-frame data rate videos have emerged on the market. Users may play these video resources through various smart terminals, such as smartphones, tablet PCs, televisions, etc. However, due to the limited decoding capability at present terminal device, high-definition and high-data rate videos still fail to be played, often resulting in slower output videos and unsynchronized playback between audios and videos. In extreme cases, an audio may have finished playing while its video is still playing, thus severely affecting the user's viewing experience.

BRIEF SUMMARY OF THE INVENTION

Accordingly, embodiments of the invention provide the following technology. The present invention provides a method for video playback and control terminals thereof, enabling high-frame data-rate videos to be smoothly played on a low decoding capability platform.

In one embodiment, the present invention adopts a technical solution for: providing a video playback method, comprising: receiving video data stream; determining whether a to-be-decoded frame in the video data stream is a non-reference frame that meets a discard condition according to the time stamp of the to-be-decoded frame; discarding the to-be-decoded frame when the to-be-decoded frame is the non-reference frame that meets the discard condition; decoding the to-be-decoded frame into a to-be-output frame when the to-be-decoded frame is not the non-reference frame that meets the discard condition; determining whether the to-be-output frame meets the discard condition according to the time stamp of the to-be-output frame; discarding the to-be-output frame when the to-be-output frame meets the discard condition; and outputting the to-be-output frame as an output frame when the to-be-output frame does not meet the discard condition, such that the time intervals of the time stamps of the sequentially output frames according to the display order are equal.

An improvement of the adopted technical solution is that the discard condition is determined by an adaptive threshold, and the video playback method further comprises: adjusting the adaptive threshold based on a synchronization level of the output frame and the decoded audio frame.

An improvement of the adopted technical solution is that the discard condition is determined by an adaptive threshold, and the step of determining whether the to-be-decoded frame is the non-reference frame that meets the discard condition according to the time stamp of the to-be-decoded frame further comprises: obtaining the time stamp of the to-be-decoded frame; mapping the timestamp of the to-be-decoded frame to a first odd-even number sequence of which numbers are increased by equal interval according to the display order; determining whether the to-be-decoded frame is the non-reference frame and whether the corresponding value of the time stamp of the to-be-decoded frame in the first odd-even number sequence can be divided by the adaptive threshold; if the to-be-decoded frame is the non-reference frame and the corresponding value of the time stamp of the to-be-decoded frame in the first odd-even number sequence cannot be divided by the adaptive threshold, determining that the to-be-decoded frame is the non-reference frame that meets the discard condition; otherwise, determining that the to-be-decoded frame is not the non-reference frame that meets the discard condition.

An improvement of the adopted technical solution is that the step of mapping the timestamp of the to-be-decoded frame to the first odd-even number sequence of which numbers are increased by equal interval according to the display order further comprises: mapping the timestamp of the to-be-decoded frame to the first odd-even number sequence by the following equation:

$$N = \frac{PTS1}{\overline{\Delta PTS}},$$

wherein N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

An improvement of the adopted technical solution is that the step of determining whether the to-be-output frame meets the discard condition according to the time stamp of the to-be-output frame further comprises: obtaining the time stamp of the to-be-output frame; mapping the timestamp of the to-be-output frame to a second odd-even number sequence of which numbers are increased by equal interval according to the display order; determining whether the corresponding value of the time stamp of the to-be-output frame in the second odd-even number sequence can be divided by the adaptive threshold; if the corresponding value of the time stamp of the to-be-output frame in the second odd-even number sequence cannot be divided by the adaptive threshold, determining that the to-be-output frame meets the discard condition; otherwise, determining that the to-be-output frame does not meet the discard condition.

An improvement of the adopted technical solution is that the step of mapping the timestamp of the to-be-output frame to the second odd-even number sequence of which numbers are increased by equal interval according to the display order further comprises: mapping the timestamp of the to-be-output frame to the second odd-even number sequence by the following equation:

$$M = \frac{PTS2}{\overline{\Delta PTS}},$$

wherein M is the corresponding value of the time stamp of the to-be-output frame in the second odd-even number sequence, PTS2 is the time stamp of the to-be-output frame, and $\overline{\Delta PTS}$ is the video time stamp increment of the video data stream.

An improvement of the adopted technical solution is that before the step of determining whether the to-be-decoded frame in the video data stream is a non-reference frame that meets a discard condition according to the time stamp of the to-be-decoded frame, the video playback method further comprises: directly decoding to the video data stream; performing difference value calculation on the time stamps of adjacent decoded frames which are being adjacently arranged according to the display order after decoding; and obtaining the video time stamp increment according to the difference value calculation result.

An improvement of the adopted technical solution is that the step of obtaining the video time stamp increment according to the difference value calculation result further comprises: calculating an average value of the multiple difference value calculation results and setting the average value to be the video time stamp increment.

An improvement of the adopted technical solution is that the step of adjusting the adaptive threshold based on the synchronization level of the output frame and the decoded audio frame further comprises: obtaining the time stamp of the output frame and the time stamp of the decoded audio frame; comparing a difference value between the time stamp of the output frame and the time stamp of the decoded audio frame with a preset time threshold; if the difference value obtained by subtracting the time stamp of the decoded audio frame from the time stamp of the output frame exceeds the preset time threshold, decreasing the step length of the adaptive threshold; if the difference value obtained by subtracting the time stamp of the output frame from the time stamp of the decoded audio frame exceeds the preset time threshold, increasing the step length of the adaptive threshold; and if an absolute value of a difference value between the time stamp of the decoded audio frame and the time stamp of the output frame is less than or equal to the preset time threshold, keeping the step length of the adaptive threshold unchanged.

In another embodiment, the present invention adopts another technical solution for: providing a control terminal for video playback, comprising: a receiving unit for receiving video data stream; a pre-decoding determination unit for determining whether a to-be-decoded frame in the video data stream is a non-reference frame that meets a discard condition according to the time stamp of the to-be-decoded frame, wherein the pre-decoding determination unit discards the to-be-decoded frame when the to-be-decoded frame is the non-reference frame that meets the discard condition; a decoding unit for decoding the to-be-decoded frame into a to-be-output frame when the to-be-decoded frame is not the non-reference frame that meets the discard condition; and a post-decoding determination unit for determining whether the to-be-output frame meets the discard condition according to the time stamp of the to-be-output frame, discarding the to-be-output frame when the to-be-output frame meets the discard condition, and outputting the to-be-output frame as an output frame when the to-be-output frame does not meet the discard condition, such that the time intervals of the time stamps of the sequentially output frames according to the display order are equal.

An improvement of the adopted technical solution is that the discard condition is determined by an adaptive threshold, and the control terminal further comprises an AV synchronization adjusting unit for adjusting the adaptive threshold based on a synchronization level of the output frame and the decoded audio frame.

An improvement of the adopted technical solution is that the pre-decoding determination unit further comprises: a first time stamp obtaining module for obtaining the time stamp of the to-be-decoded frame; a first mapping module for mapping the timestamp of the to-be-decoded frame to a first odd-even number sequence of which numbers are increased by equal interval according to the display order; and a first determination module for determining whether the to-be-decoded frame is the non-reference frame and whether the corresponding value of the time stamp of the to-be-decoded frame in the first odd-even number sequence can be divided by the adaptive threshold; if the to-be-decoded frame is the non-reference frame and the corresponding value of the time stamp of the to-be-decoded frame in the first odd-even number sequence cannot be divided by the adaptive threshold, determining that the to-be-decoded frame is the non-reference frame that meets the discard condition; otherwise, determining that the to-be-decoded frame is not the non-reference frame that meets the discard condition.

An improvement of the adopted technical solution is that the first mapping module further maps the timestamp of the to-be-decoded frame to the first odd-even number sequence by the following equation:

$$N = \frac{PTS1}{\overline{\Delta PTS}},$$

wherein N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

An improvement of the adopted technical solution is that the post-decoding determination unit further comprises: a second time stamp obtaining module for obtaining the time stamp of the to-be-output frame; a second mapping module for mapping the timestamp of the to-be-output frame to a second odd-even number sequence of which numbers are increased by equal interval according to the display order; and a second determination module for determining whether the corresponding value of the time stamp of the to-be-output frame in the second odd-even number sequence can be divided by the adaptive threshold; if the corresponding value of the time stamp of the to-be-output frame in the second odd-even number sequence cannot be divided by the adaptive threshold, determining that the to-be-output frame meets the discard condition; otherwise, determining that the to-be-output frame does not meet the discard condition.

An improvement of the adopted technical solution is that the second mapping module further maps the timestamp of the to-be-output frame to the second odd-even number sequence by the following equation:

$$M = \frac{PTS2}{\overline{\Delta PTS}},$$

wherein M is the corresponding value of the time stamp of the to-be-output frame in the second odd-even number sequence, PTS2 is the time stamp of the to-be-output frame, and $\overline{\Delta PTS}$ is the video time stamp increment of the video data stream An improvement of the adopted technical solution is that the control terminal further comprises a time stamp increment obtaining module for performing difference value calculation on the time stamps of adjacent decoded frames which are generated by the decoding unit directly decoding the video data stream and are being adjacently arranged according to the display order after the decoding and obtaining the video time stamp increment according to the difference value calculation result.

An improvement of the adopted technical solution is that the time stamp increment obtaining module further calculates an average value of the multiple difference value calculation results and sets the average value to be the video time stamp increment.

An improvement of the adopted technical solution is that the AV synchronization adjusting unit further obtains the time stamp of the output frame and the time stamp of the decoded audio frame and compares a difference value between the time stamp of the output frame and the time stamp of the decoded audio frame with a preset time threshold; if the difference value obtained by subtracting the time stamp of the decoded audio frame from the time stamp of the output frame exceeds the preset time threshold, the AV synchronization adjusting unit decreases the step length of the adaptive threshold; if the difference value obtained by subtracting the time stamp of the output frame from the time stamp of the decoded audio frame exceeds the preset time threshold, the AV synchronization adjusting unit increases the step length of the adaptive threshold; and if an absolute value of a difference value between the time stamp of the decoded audio frame and the time stamp of the output frame is less than or equal to the preset time threshold, the AV synchronization adjusting unit keeps the step length of the adaptive threshold unchanged.

As can be seen from the above technical solution, the embodiment of the present invention has the following beneficial effects:

By partially discarding the non-reference frame part before decoding and partially discarding the reference frame after decoding of the present invention, equal time interval drop can be achieved; such that high-frame rate and high-data rate video data can then be played on a platform with insufficient decoding capability; the achievement of an equal time interval drop frame ensures the smooth play of video data on a low decoding capability platform after the drop.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The invention can be more fully understood by reading the subsequent detailed description and examples with references made to the accompanying drawings. The following description is of the best-contemplated mode of carrying out the invention. This description is made for the purpose of illustrating the general principles of the invention and should not be taken in a limiting sense. The scope of the disclosure is best determined by reference to the appended claims.

Figure 1:
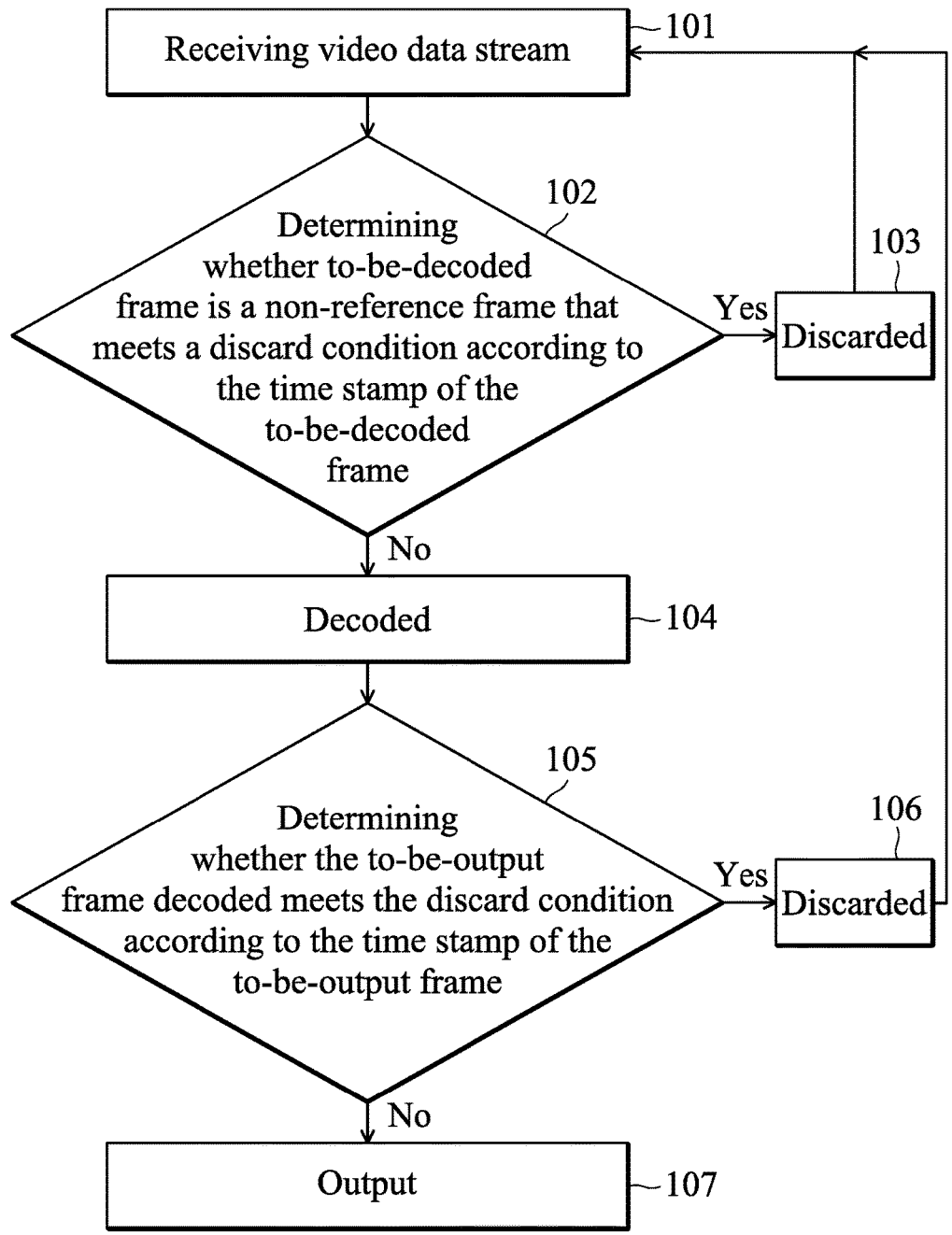
FIG. 1 is a flowchart of a video playback method according to an embodiment of the invention.

As shown in FIG. 1, FIG. 1 is a flowchart of a video playback method according to an embodiment of the present invention. The video playback method provided in this embodiment includes the following steps:

Step 101: receiving video data stream.

In this embodiment, the video data stream contains multiple continuous video frames, wherein video frames which have not been decoded can be referred to as frames to be decoded or to-be-decoded frames, video frames which have been decoded can be referred to as frames to be output or to-be-output frames, and video frames output for display after decoded can be referred to as output frames. Generally, to-be-decoded frames can be divided into reference frames and non-reference frames. A reference frame is the frame that needs to be considered during IPB coding and video frames other than reference frames are the non-reference frames. Further, each video frame obtained before and after decoding (including the to-be-decoded frame, the to-be-output frame and the output frame) may include time stamp information assigned during frame coding.

Step 102: determining whether a to-be-decoded frame in the video data stream is a non-reference frame that meets a discard condition according to the time stamp of the to-be-decoded frame.

In this embodiment, the discard condition can be set according to the actual requirement to remove the video frames with time stamps that meet the discard condition from the sequence of to-be-decoded frames, thereby reducing the frame rate of the video data stream, thereby matching the subsequent decoding platform with low frame rate decoding capability. However, blur of decoded image may be caused if the reference frames are discarded before decoding, so in this step, in addition to determining whether the to-be-decoded frame meets a discard condition according to the time stamp of the to-be-decoded frame, it is further determined whether the to-be-decoded frame is a non-reference frame. If the to-be-decoded frame is a non-reference frame that meets the discard condition, step 103 is performed, and if the to-be-decoded frame is not the non-reference frame that meets the discard condition, step 104 is performed.

Step 103: discarding the to-be-decoded frame.

In this embodiment, the non-reference frames that meet the discard condition will be directly discarded before decoding and process returns to step 101 to receive a new to-be-decoded frame.

Step 104: decoding the to-be-decoded frame into a to-be-output frame.

In this embodiment, the non-reference frames and reference frames that do not meet the discard condition and the reference frames that meet the discard condition are decoded in order to effectively prevent image blur after decoded.

Step 105: determining whether the to-be-output frame meets the discard condition according to the time stamp of the to-be-output frame.

In this embodiment, the time stamp of the to-be-output frame and the time stamp of the corresponding to-be-decoded frame are consistent. Therefore, through the above discard condition, the to-be-output frame corresponding to the reference frame that meets the discard condition before decoding can be further determined. Specifically, if a to-be-output frame meets the discard condition, it means the to-be-decoded frame corresponding to the to-be-output frame is the reference frame that meets the discard condition or it is the non-reference frame that meets the discard condition. In that case, step 106 is performed. If the to-be-output frame does not meet the discard condition, step 107 is performed.

Step 106: discarding the to-be-output frame.

In this embodiment, after the decoding, the to-be-output frames corresponding to the reference frames that meet the discard condition will be discarded and process returns to step 101 to receive a new to-be-decoded frame.

Step 107: outputting the to-be-output frame as an output frame.

In this embodiment, the decoded non-reference frames and reference frames that do not meet the discard condition are output to be used for subsequent display.

It should be noted that, through the above method, the time stamps of the frames sequentially outputted according to display order possesses equal time interval. While achieving the purpose of equal time interval drop, the blur of decoded image due to the discarded reference frame before decoding can be effectively prevented.

Figure 2:
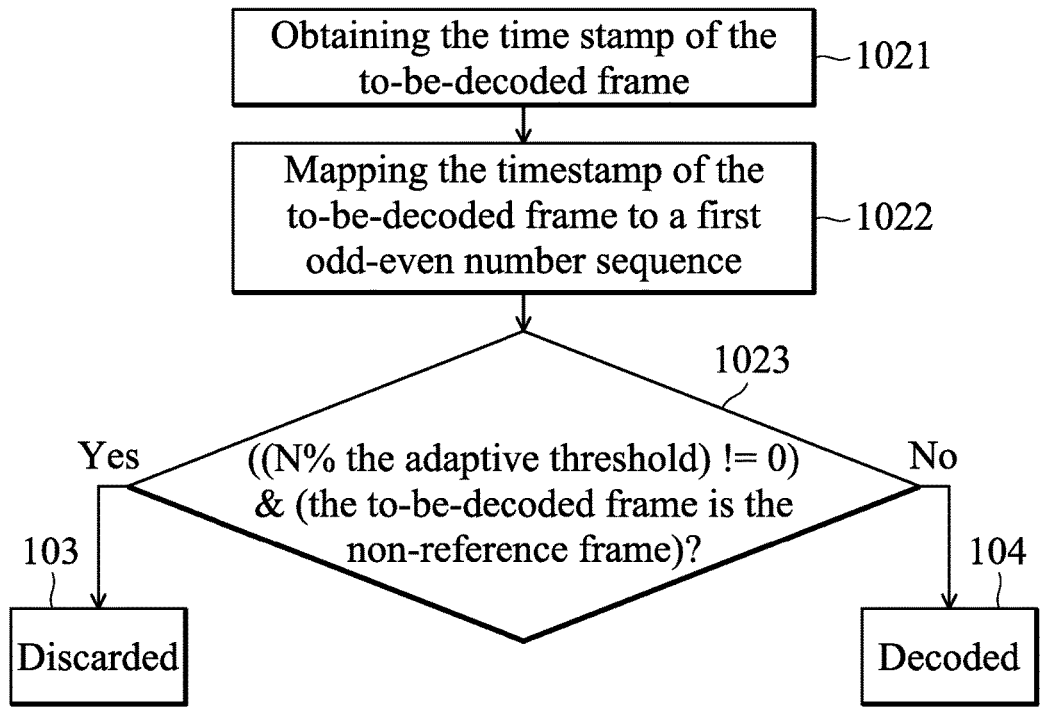
FIG. 2 is a flowchart of the step 102 as shown in FIG. 1 according to a preferred embodiment of the invention.

As shown in FIG. 2, FIG. 2 is a flowchart of the step 102 as shown in FIG. 1 according to a preferred embodiment of the invention. In this embodiment, the discard condition is determined by an adaptive threshold. Specifically, the process of determining whether the to-be-decoded frame is the non-reference frame that meets the discard condition according to the time stamp of the to-be-decoded frame may further include the following steps:

Step 1021: obtaining the time stamp PTS1 of the to-be-decoded frame; and

Step S1022: mapping the timestamp of the to-be-decoded frame to a first odd-even number sequence of which numbers are increased by equal amount according to the display order.

In this embodiment, the time stamp of the to-be-decoded frame can be mapped to the first odd-even number sequence by a first mapping equation as follows:

$$N = \frac{PTS1}{\overline{\Delta PTS}}.$$

In this equation, N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

Step 1023: determining whether the to-be-decoded frame is the non-reference frame and whether the corresponding value N of the time stamp of the to-be-decoded frame in the first odd-even number sequence can be divided by the adaptive threshold.

In this embodiment, if the to-be-decoded frame is the non-reference frame and the corresponding value N of the time stamp of the to-be-decoded frame in the first odd-even number sequence cannot be divided by the adaptive threshold, the to-be-decoded frame is determined as the non-reference frame that meets the discard condition and thus step 103 is performed to discard the to-be-decoded frame. Otherwise, the to-be-decoded frame is determined as not the non-reference frame that meets the discard condition and thus step 104 is performed to decode the to-be-decoded frame to form a to-be-output frame. Note that the determination of whether the to-be-decoded frame is the non-reference frame and the determination of whether the corresponding value of the time stamp of the to-be-decoded frame in the first odd-even number sequence can be divided by the adaptive threshold performed in step 1023 can be split into two sub-steps, and the execution order of these two sub-steps and other steps can be adjusted according to need, and the invention is not limited thereto.

Figure 3:
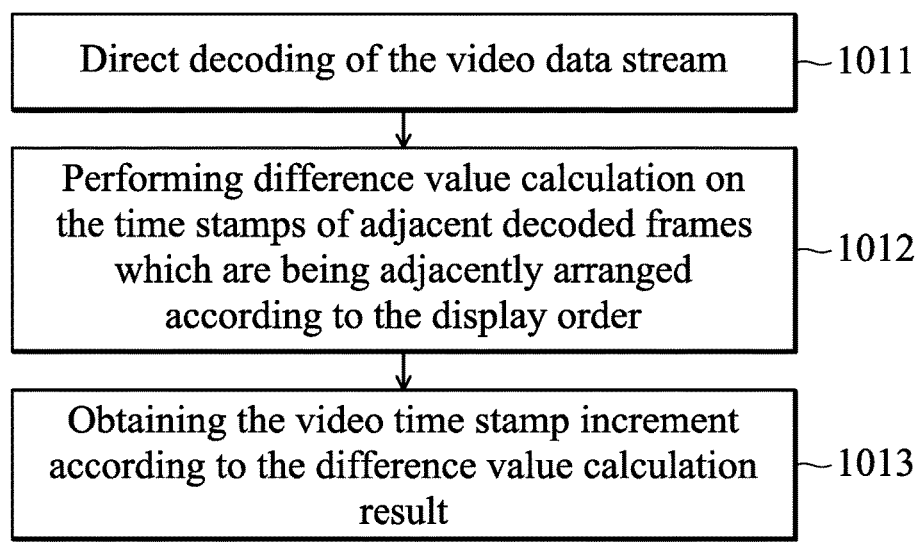
FIG. 3 is a flowchart of obtaining the time stamp increment in the step 102 as shown in FIG. 1 according to a preferred embodiment of the invention.

As shown in FIG. 3, FIG. 3 is a flowchart of obtaining the time stamp increment in the step 1022 as shown in FIG. 2 according to a preferred embodiment of the invention.

In the present invention, the video time stamp increment $\overline{\Delta PTS}$ of the video data stream can be obtained in various ways. A preferred method for obtaining the video time stamp increment $\overline{\Delta PTS}$ is provided in this embodiment. The method can be performed at the beginning of video playback, that is, performed between step 101 and step 102. The method may specifically include the following steps:

Step 1011: direct decoding of the video data stream.

In this embodiment, the video frames in the video data stream are directly decoded without performing the frame drop operation, so as to keep the frame rates of video frame consistent after and before the decoding.

Step 1012: performing difference value calculation on the time stamps of adjacent decoded frames which are being adjacently arranged according to the display order after decoding, in order to obtain a difference value calculation result $\Delta PTS$.

Step 1013: obtaining the video time stamp increment $\overline{\Delta PTS}$ according to the difference value calculation result $\Delta PTS$.

In this embodiment, a single difference value calculation result $\Delta PTS$ can be referred to as the video time stamp increment $\overline{\Delta PTS}$. Preferably, multiple difference value calculation results $\Delta PTSs$ are averaged to calculate an average value and the average value is set to be the video time stamp increment $\overline{\Delta PTS}$. Among them, the number of difference value calculation results $\Delta PTSs$ used for calculating the average value is estimated according to the decoding speed of the decoder and the feedback speed of system, the number is dependent on specific system and decoder.

Figure 4:
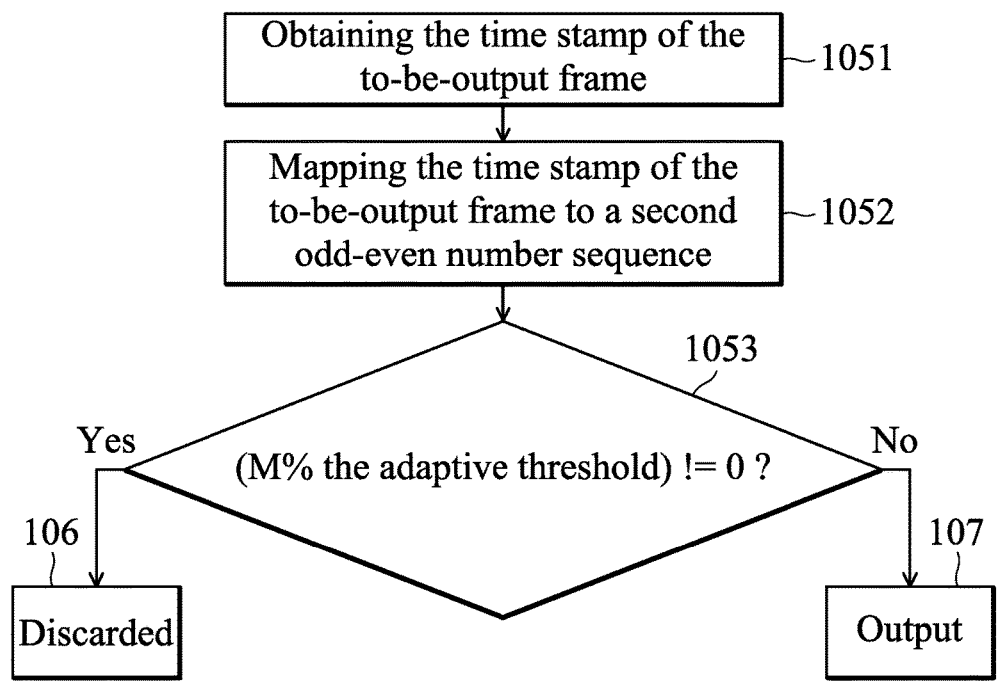
FIG. 4 is a flowchart of the step 105 as shown in FIG. 1 according to a preferred embodiment of the invention.

As shown in FIG. 4, FIG. 4 is a flowchart of the step 105 as shown in FIG. 1 according to a preferred embodiment of the invention. In this embodiment, the step of determining whether the to-be-output frame meets the discard condition according to the time stamp of the to-be-output frame may specifically include the following steps:

Step 1051: obtaining the time stamp PTS2 of the to-be-output frame.

Step 1052: mapping the time stamp of the to-be-output frame to a second odd-even number sequence of which numbers are increased by equal interval according to the display order. Specifically, the time stamp of the to-be-output frame may be mapped to the second odd-even number sequence of the display order interval increment through a second mapping equation, where the second mapping equation is:

$$M = \frac{PTS2}{\overline{\Delta PTS}}.$$

In the equation, M is the corresponding value of time stamp of a to-be-decoded frame in the second odd-even number sequence, PTS2 is the time stamp of the to-be-decoded frame, and $\overline{\Delta PTS}$ is the video time stamp increment of the video data stream.

Step 1053: determining whether the corresponding value M of the time stamp of the to-be-output frame in the second odd-even number sequence can be divided by the adaptive threshold.

In the embodiment, if the corresponding value M of the time stamp of the to-be-output frame in the second odd-even number sequence cannot be divided by the adaptive threshold, the to-be-output frame meets the discard condition, i.e., the to-be-decoded frame corresponding to the to-be-output frame is the reference frame that meets the discard condition, and thus step 106 is performed to discard the to-be-output frame. Otherwise, the to-be-output frame does not meet the discard condition, i.e., the to-be-decoded frame corresponding to the to-be-output frame is the reference frame or non-reference frame that does not meet the discard condition, and thus step 107 is performed to output the to-be-output frame for subsequent display.

In the aforementioned step, the video time stamp increment $\overline{\Delta PTS}$ of the video data stream can be obtained using the method described above, or it can also be obtained using other ways well-known in the art.

Figure 5A:
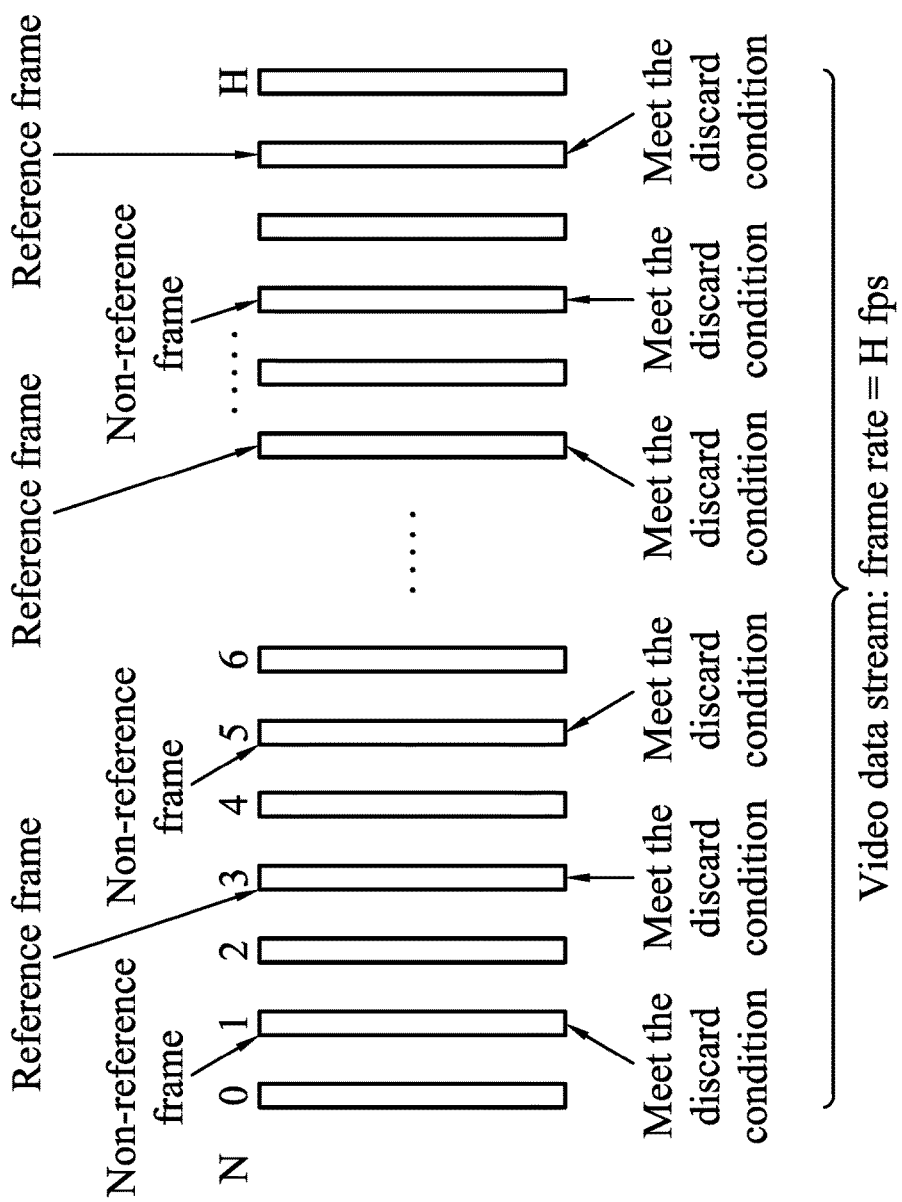
FIG. 5A to FIG. 5C are schematic diagrams illustrating the video frames arranged according to the display order in each step of the video playback method as shown in FIG. 1 according to an embodiment of the invention.
Figure 5B:
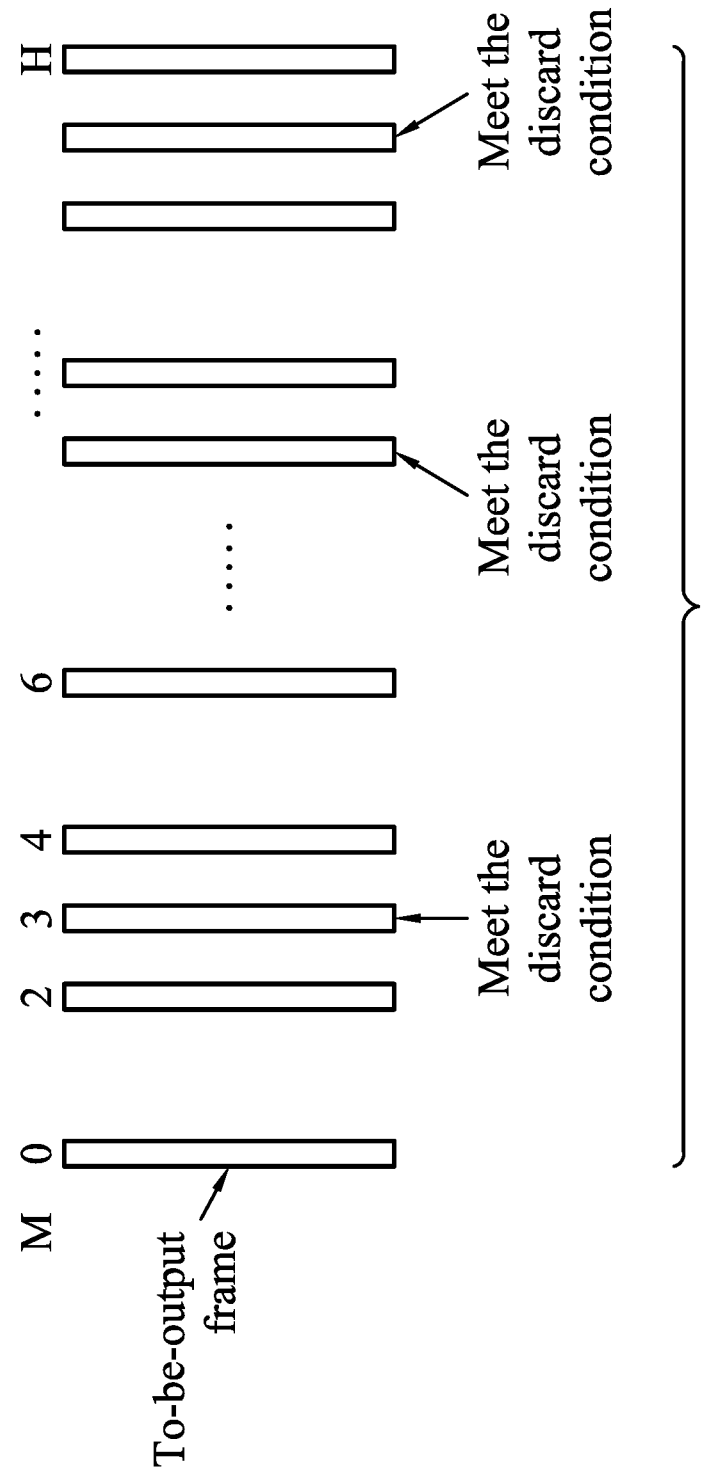
Figure 5C:
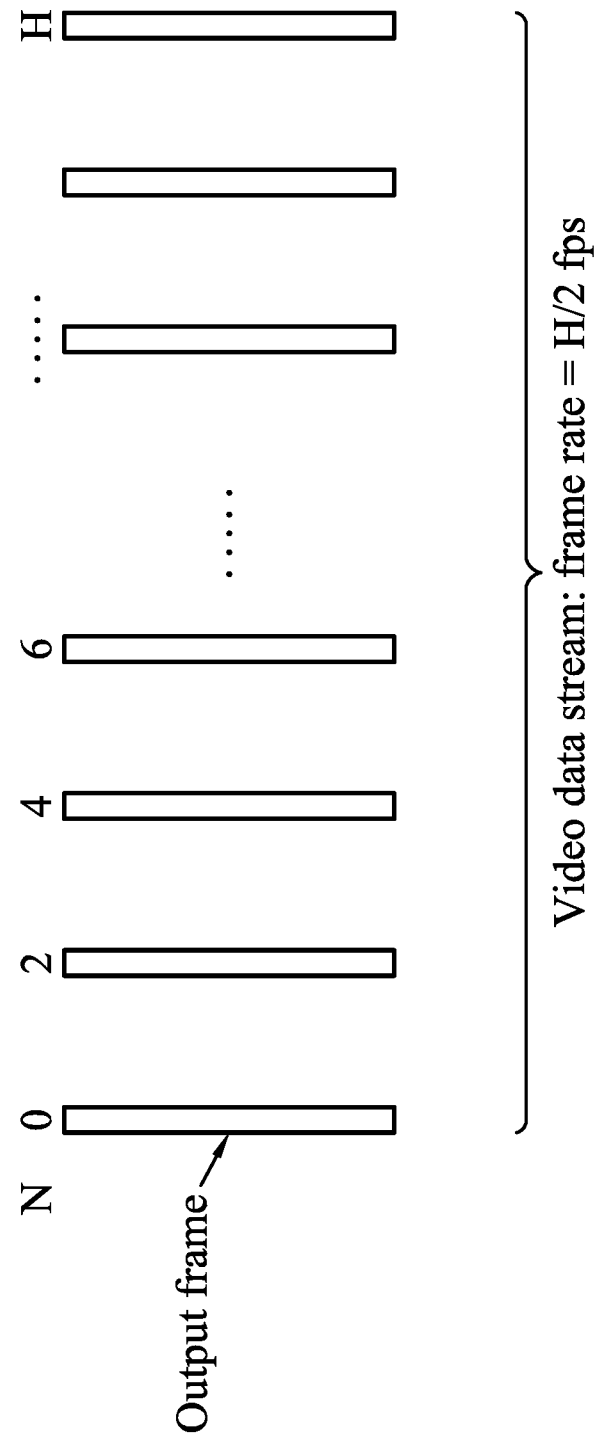

As shown in FIGS. 5A to 5C, FIGS. 5A to 5C are schematic diagrams illustrating the video frames arranged according to the display order in each step of the video playback method as shown in FIG. 1 according to an embodiment of the invention.

As shown in FIG. 5A, assuming the frame rate of the to-be-decoded frame sequence of a video data stream is H fps, the number of frames played per second will be number H, consisting of reference frames and non-reference frames. Each video frame includes time stamp information assigned during coding. Based on the display order, one time stamp increment $\overline{\Delta PTS}$ exists between every two video frames. At this time, the video time stamp increment $\overline{\Delta PTS}$ is used as a mapping condition to map the respective time stamp of the to-be-decoded frame to the first odd-even number sequence. The numerical value N in the first odd-even number sequence of the to-be-decoded frame is sequenced 0, 1, 2, 3, 4, 5, 6 . . . .

Assuming the adaptive threshold is set as 2, then N=1, 3, 5 . . . in FIG. 5A cannot be divided by 2. That is, a discard condition is met. When N=0, 2, 4, . . . , it can be divided by 2. That is, a discard condition is not met. Furthermore, the to-be-decoded frames of N=1, 5 . . . are determined as the non-reference frames and thus are discarded; the to-be-decoded frames of N=1, 5 . . . are determined as the reference frames and thus are retained. The to-be-decoded frames of N=0, 2, 4, . . . and the reference frames are then decoded to form the to-be-output frame sequence as shown in FIG. 5B.

Subsequently, as shown in FIG. 5B, the time stamp of the respective to-be-output frame is mapped to the second odd-even number sequence using the video time stamp increment $\overline{\Delta PTS}$ as the mapping condition, the numerical value M of the respective to-be-decoded frame in the second odd-even number sequence is sequenced 0, 2, 3, 4, 6 . . . . The corresponding position of the to-be-decoded frame deleted before decoding will remain vacant.

Subsequently, if adaptive threshold 2 serves as a discard condition, N=3 in FIG. 5B cannot be divided by 2. That is, the discard condition is met, and thus it is discarded. N=0, 2, 4 . . . can be divided by 2, which means the discard condition is not met, and thus they are outputted to form the output frame sequence as shown in FIG. 5C. In particular, the comparison of FIG. 5A and FIG. 5C shows that the frame rate of the to-be-decoded frame sequence in FIG. 5A is H fps, while the frame rate of the output frame sequence in FIG. 5C is H/2 fps. While the frame rate is reduced effectively, equal time interval drop is also achieved. Therefore, assuming the decoding capability of the current playback platform decoder is h fps, the number of frames decoded per second will be h. Additionally, when h<H, the number Num of video frames discarded per second will meet Num≥H−h as long as a reasonable discard condition is set. That is, the normal play of a video data stream on the previously mentioned platform can be guaranteed.

It should be understood that, the above-mentioned output frame rate is equal to H/(adaptive threshold). Therefore, the adaptive threshold is applied to control the output time interval between final output frames. The size of the value will determine the quantity of video frames discarded. The value range of the adaptive threshold is: equal to or larger than 1. The higher the adaptive threshold value, the larger the quantity of video frames discarded and the greater the output time interval between the final output frames.

It should further be understood that, when a decoder on the playback platform meets the decoding needs of a video data stream (i.e. h≥H), the system will choose not to perform the aforementioned steps 101-107. The function will be turned off, or the above adaptive threshold will be set as 1. At this time, all the Ns can be divided by the adaptive threshold. Thus, video frame drop operations in the video data stream will not take place.

In a preferred embodiment, frame rates supported by the decoder under video data streams of various resolutions can be measured. According to the resolutions of video data streams received, it is determined if the decoder can meet the decoding needs of video data streams and further decided if the above function will be activated. Further preferably, different adaptive thresholds can be set for different resolutions according to the frame rates supported by the decoder under video data streams of various resolutions in order to set corresponding adaptive threshold according to different resolutions of video data stream received.

Figure 6:
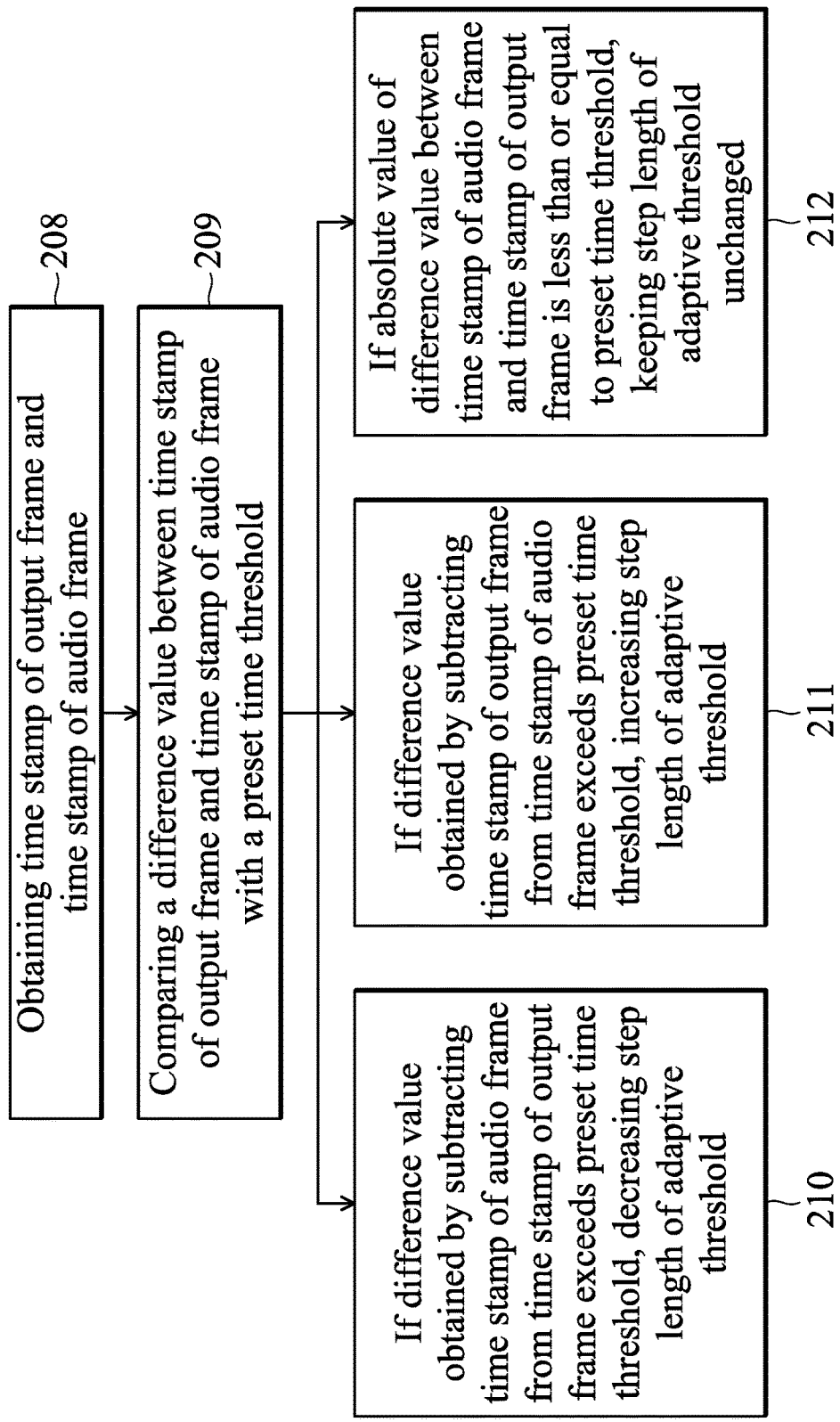
FIG. 6 is a flowchart of a method for adaptive threshold adjustment in the video playback method according to an embodiment of the invention.

FIG. 6 is a flowchart of a method for adaptive threshold adjustment in the video playback method according to an embodiment of the invention.

It should be noted that steps 201-207 in this embodiment are the same as steps 101-107 in the first embodiment, and thus are omitted here for brevity and FIG. 6 is not detailed either. In the video playback method of the present invention provided, the adaptive threshold can be adjusted according to the synchronization level between the output frame and the decoded audio frame. It can also be adjusted according to any adjustment method well-known in the art. In this embodiment, preferably, the step of adjusting the adaptive threshold based on the synchronization level of the output frame and the decoded audio frame may further comprise the following steps:

Step 208: obtaining the time stamp $PTS_{output\_frame}$ of the output frame and the time stamp $PTS_{audio\_frame}$ of the decoded audio frame;

Step 209: comparing a difference value between the time stamp $PTS_{output\_frame}$ of the output frame and the time stamp $PTS_{audio\_frame}$ of the decoded audio frame with a preset time threshold;

Step 210: if the difference value obtained by subtracting the time stamp $PTS_{audio\_frame}$ of the decoded audio frame from the time stamp $PTS_{output\_frame}$ of the output frame exceeds the preset time threshold, decreasing the step length of the adaptive threshold.

If the difference value obtained by subtracting the time stamp of the decoded audio frame from the time stamp of the output frame exceeds the preset time threshold, it means playback of the output frame is faster than that of the audio frame. That is, the video is faster than the audio. In this example, the video time stamp decoded by the unit time is faster than the audio. When this happens, it is not necessary that more frames should be discarded before decoding. Therefore, the step length of the adaptive threshold may be decreased to achieve less frame drops, thereby achieving the purpose of enhanced viewing experience.

Step 211: if the difference value obtained by subtracting the time stamp $PTS_{output\_frame}$ of the output frame from the time stamp $PTS_{audio\_frame}$ of the decoded audio frame exceeds the preset time threshold, increasing the step length of the adaptive threshold.

If the difference value obtained by subtracting the time stamp of the output frame from the time stamp of the decoded audio frame exceeds the preset time threshold, it means playback of the output frame is slower than that of the audio frame. That is, the video is slower than the audio. In this example, the video time stamp decoded by the unit time is slower than the audio. When this happens, more frames should be discarded before decoding for the time stamp of output frames to keep up with the time stamp of audio frames. Therefore, the step length of the adaptive threshold may be increased to achieve more frame drops, thereby achieving the purpose of enhanced playback experience.

Step 212: if an absolute value of the difference value between the time stamp of the decoded audio frame $PTS_{audio\_frame}$ and the time stamp of the output frame $PTS_{output\_frame}$ is less than or equal to the preset time threshold, the step length of the adaptive threshold is kept unchanged.

In this step, if the absolute value of the difference value between the time stamp of the decoded audio frame and the time stamp of the output frame is less than or equal to the preset time threshold, it means the synchronization level of the output frame and the audio frame is within the acceptable range, the playback experience is not affected. Therefore, the step length of the adaptive threshold needs not be adjusted, and thus it remains unchanged. However, the absolute value of the difference value between the time stamp of the decoded audio frame and the time stamp of the output frame is greater than the preset time threshold in step 210 and step 211, which means the output frame plays faster or slower than the audio frame, thus the playback experience is affected. In this example, the step length of the adaptive threshold needs to be adjusted.

In the above embodiment, the preset time threshold can be the critical value of time stamp PTS for unsynchronized video and audio that can be clearly detected by the human eyes. After the step length of the adaptive threshold has been increased or decreased, the process returns to step 201 to receive a new to-be-decoded frame, and performs steps 201-207 according to the adjusted adaptive threshold.

It should be understood that the embodiments described are merely part of the embodiments of the present invention, they are not meant to be exhaustive. In view of the embodiments of the present invention, all embodiments obtained by those skilled in the art without creative efforts should fall in the scope of the present invention.

Figure 7:
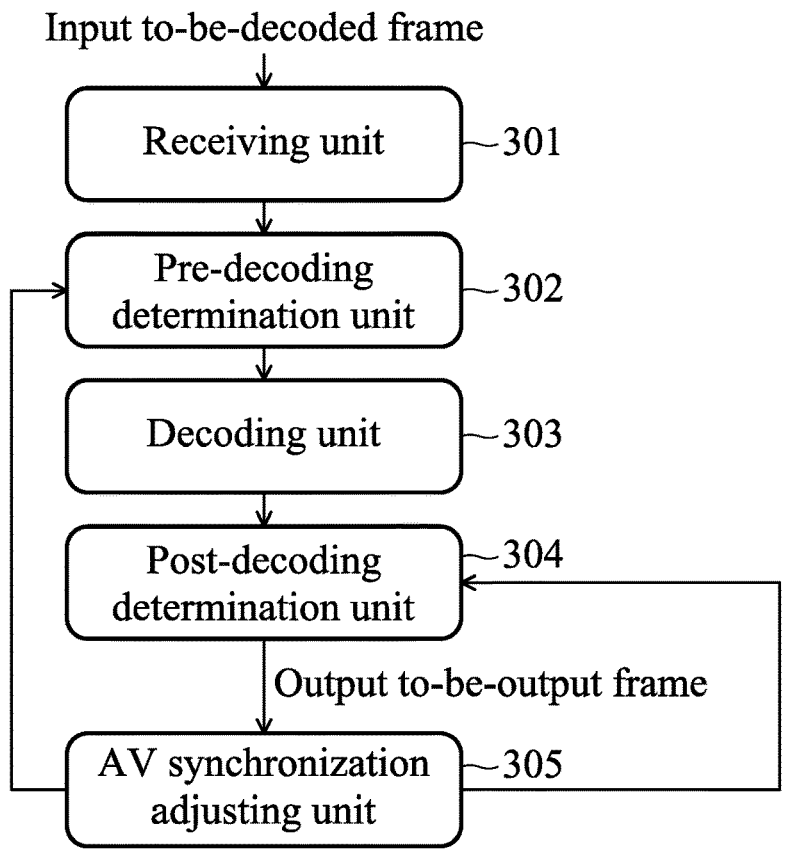
FIG. 7 is a schematic diagram illustrating a structure of a control terminal for video playback according to an embodiment of the invention.

As shown in FIG. 7, FIG. 7 is a schematic diagram illustrating a structure of a control terminal for video playback according to an embodiment of the invention. The control terminal for video playback provided in this embodiment may include:

A receiving unit 301, which is configured to receive video data streams.

In this embodiment, a video data steam includes multiple continuous video frames. A video frame that has not been decoded is referred to as a to-be-decoded frame; a video frame that has been decoded is referred to as a to-be-output frame; and a video frame output for display after decoded is referred to as an output frame. In general, to-be-decoded frames can be divided into reference frames and non-reference frames. A reference frame is the frame that needs to be considered during IPB coding; and video frames other than reference frames are non-reference frames. Each video frame obtained before and after decoding (including to-be-decoded frames, to-be-output frames, and output frames) contains time stamp information assigned during coding.

A pre-decoding determination unit 302, which is used for determining whether a to-be-decoded frame in the video data stream is a non-reference frame that meets a discard condition according to the time stamp of the to-be-decoded frame.

In this embodiment, the discard condition can be set according to the actual need to remove the video frames with time stamps that meet the discard condition from the sequence of to-be-decoded frames, thereby reducing the frame rate of the video data stream, and thereby matching the subsequent decoding platform with low frame rate decoding capability. However, blur of decoded image may be caused if the reference frames are discarded before decoding. Thus, the pre-decoding determination unit 302, in addition to determining whether the to-be-decoded frame meets the discard condition according to the time stamp of the to-be-decoded frame, further determines whether the to-be-decoded frame is a non-reference frame. If the to-be-decoded frame is a non-reference frame that meets the discard condition, the to-be-decoded frame is discarded. If the to-be-decoded frame is not the non-reference frame that meets the discard condition, it is further processed by the decoding unit 303.

In this embodiment, the non-reference frames that meet the discard condition will be directly discarded before decoding and feedback to the receiving unit 301 to receive a new to-be-decoded frame.

A decoding unit 303, which is used for decoding the to-be-decoded frame into a to-be-output frame.

In this embodiment, the non-reference frames and reference frames that do not meet the discard condition and the reference frames that meet the discard condition are decoded by the decoding unit 303 to effectively prevent image blur after decoding.

A post-decoding determination unit 304, which is used for determining whether the to-be-output frame meets the discard condition according to the time stamp of the to-be-output frame.

In this embodiment, the time stamp of the to-be-output frame and the time stamp of the corresponding to-be-decoded frame are consistent. Therefore, through the above discard condition, the to-be-output frame corresponding to the reference frame that meets the discard condition before decoding can be further determined. Specifically, if a to-be-output frame meets the discard condition, it means the to-be-decoded frame corresponding to the to-be-output frame is the reference frame that meets the discard condition or it is the non-reference frame that meets the discard condition. In that case, the post-decoding determination unit 304 discards the to-be-output frame. If the to-be-output frame does not meet the discard condition, the post-decoding determination unit 304 outputs the to-be-output frame as an output frame.

In this embodiment, after the decoding, the post-decoding determination unit 304 discards the to-be-output frames corresponding to the reference frames that meet the discard condition and feeds back to the receiving unit 301 to receive a new to-be-decoded frame.

In this embodiment, the post-decoding determination unit 304 outputs the decoded non-reference frames and reference frames that do not meet the discard condition to be used for subsequent display.

An AV synchronization adjusting unit 305 which is used for adjusting the adaptive threshold based on a synchronization level of the output frame and the decoded audio frame.

In this embodiment, after the output frame is being output, the AV synchronization adjusting unit 305 further obtains the time stamp of the output frame and the time stamp of the decoded audio frame and compares a difference value between the time stamp of the output frame and the time stamp of the decoded audio frame with a preset time threshold; if the difference value obtained by subtracting the time stamp of the decoded audio frame from the time stamp of the output frame exceeds the preset time threshold, the AV synchronization adjusting unit 305 decreases the step length of the adaptive threshold; if the difference value obtained by subtracting the time stamp of the output frame from the time stamp of the decoded audio frame exceeds the preset time threshold, the AV synchronization adjusting unit 305 increases the step length of the adaptive threshold; and the adjusting result is fed back to the pre-decoding determination unit 302 and post-decoding determination unit 304 to make amendment to the adaptive threshold accordingly. If an absolute value of the difference value between the time stamp of the decoded audio frame and the time stamp of the output frame is less than or equal to the preset time threshold, the AV synchronization adjusting unit 305 keeps the step length of the adaptive threshold unchanged.

In the above embodiment, the preset time threshold can be the critical value of time stamp PTS for unsynchronized video and audio that can be clearly detected by the human eyes.

It should be noted that, through the control terminal, the time stamps of the sequentially output frames according to display order possesses equal interval. While achieving the purpose of equal time interval drop, blur of decoded image due to the discarded reference frame before decoding can be effectively prevented.

Figure 8:
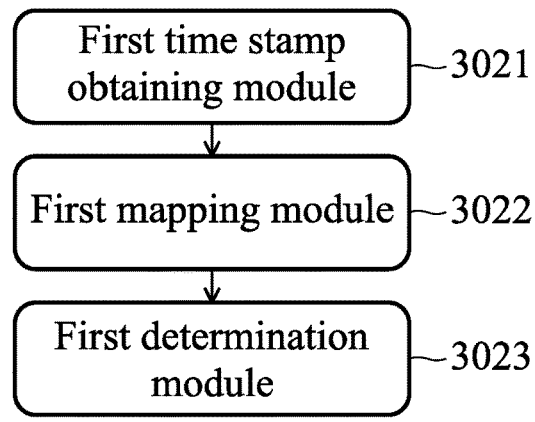
FIG. 8 is a schematic diagram illustrating a structure of the pre-decoding determination unit 302 as shown in FIG. 7 according to a preferred embodiment of the invention.

As shown in FIG. 8, FIG. 8 is a schematic diagram illustrating a structure of the pre-decoding determination unit 302 as shown in FIG. 7 according to a preferred embodiment of the invention. In this embodiment, the discard condition is determined by the adaptive threshold. The pre-decoding determination unit 302 may further comprise:

A first time stamp obtaining module 3021, which is used for obtaining the time stamp of the to-be-decoded frame.

A first mapping module 3022, which is used for mapping the time stamp of the to-be-decoded frame to a first odd-even number sequence of which numbers are increased by equal interval according to the display order.

In this embodiment, the first mapping module 3022 may map the time stamp of the to-be-decoded frame to the first odd-even number sequence by a first mapping equation as follows:

$$N = \frac{PTS1}{\overline{\Delta PTS}}.$$

In this equation, N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

A first determination module 3023, which is used for determining whether the to-be-decoded frame is a non-reference frame and whether the corresponding value of the time stamp of the to-be-decoded frame in the first odd-even number sequence can be divided by the adaptive threshold.

In this embodiment, if the to-be-decoded frame is a non-reference frame and the corresponding value N of the time stamp of the to-be-decoded frame in the first odd-even number sequence cannot be divided by the adaptive threshold, the to-be-decoded frame is determined as a non-reference frame that meets the discard condition and thus the to-be-decoded frame is discarded. Otherwise, the to-be-decoded frame is determined as not a non-reference frame that meets the discard condition and which will be further processed by the decoding unit 303 to decode the to-be-decoded frame to form a to-be-output frame. Note that the determination of whether the to-be-decoded frame is a non-reference frame and the determination of whether the corresponding value of the time stamp of the to-be-decoded frame in the first odd-even number sequence can be divided by the adaptive threshold performed by the first determining module 3023 can be split into two sub-steps, and the execution order of these two sub-steps and other steps can be adjusted according to need, and the invention is not limited thereto.

Figure 9:
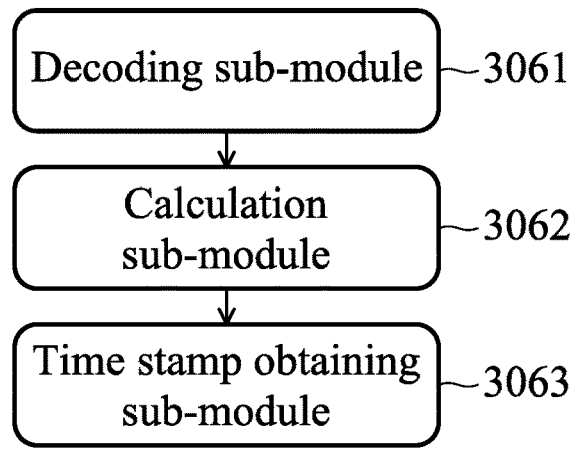
FIG. 9 is a schematic diagram illustrating a structure of the time stamp increment obtaining module 306 as shown in FIG. 7 according to a preferred embodiment of the invention.

As shown in FIG. 9, FIG. 9 is a schematic diagram illustrating a structure of the time stamp increment obtaining module 306 as shown in FIG. 7 according to a preferred embodiment of the invention.

In the present invention, the video time stamp increment $\overline{\Delta PTS}$ of the video data stream can be obtained by signal obtaining devices. A preferred device for obtaining the video time stamp increment $\overline{\Delta PTS}$ is provided in this embodiment. The device can operate at the beginning of video playback, that is, operate between the receiving unit 301 and the pre-decoding determination unit 302. The time stamp increment obtaining module 306 may specifically comprise:

A decoding sub-module 3061, which is used for directly decoding of the video data stream.

In this embodiment, the video frames in the video data stream are directly decoded without performing the frame drop operation, so as to keep the frame rates of video frame consistent after and before decoding. It should be noted that, the decoding unit 303 and the decoding sub-module 3061 may be configured in a same device or may be two separate devices.

A calculation sub-module 3062, which is used for performing difference value calculation on the time stamps of adjacent decoded frames which are being arranged according to the display order after decoding to obtain a difference value calculation result ΔPTS.

A time stamp obtaining sub-module 3063, which is used for obtaining the video time stamp increment $\overline{\Delta PTS}$ according to the difference value calculation result ΔPTS. It should be noted that, the time stamp obtaining sub-module 3063, the first time stamp obtaining module 3021 and the second time stamp obtaining module 3041 may be a same device, any two devices share a separate stand-alone device or three separate devices.

In this embodiment, a single difference value calculation result ΔPTS can be referred to as the video time stamp increment $\overline{\Delta PTS}$. Preferably, multiple difference value calculation results ΔPTSs are averaged to calculate an average value and the average value is set to be the video time stamp increment $\overline{\Delta PTS}$. Among them, the number of difference value calculation results ΔPTSs used for calculating the average value is estimated according to the decoding speed of the decoder and the feedback speed of system, which is dependent on the specific system and decoder.

Figure 10:
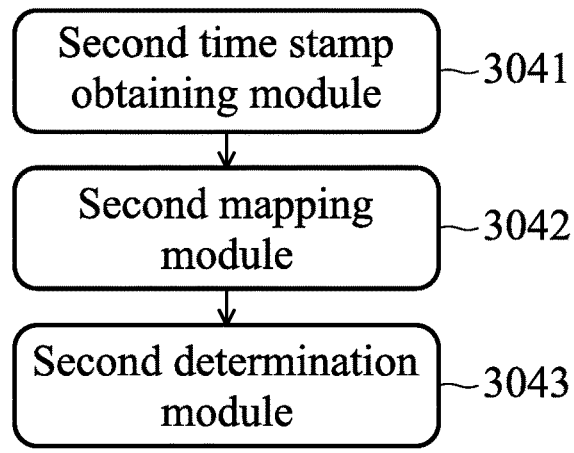
FIG. 10 is a schematic diagram illustrating a structure of the post-decoding determination unit 304 as shown in FIG. 7 according to a preferred embodiment of the invention.

As shown in FIG. 10, FIG. 10 is a schematic diagram illustrating a structure of the post-decoding determination unit 304 as shown in FIG. 7 according to a preferred embodiment of the invention. The post-decoding determination unit 304 may further comprise:

A second time stamp obtaining module 3041, which is used for obtaining the time stamp of the to-be-output frame.

A second mapping module 3042, which is used for mapping the timestamp of the to-be-output frame to a second odd-even number sequence of which numbers are increased by equal interval according to the display order;

Specifically, the time stamp of the to-be-output frame may be mapped to the second odd-even number sequence of the increased display order through the second mapping equation, where the second mapping equation is:

$$M = \frac{PTS2}{\overline{\Delta PTS}}.$$

In the equation, M is the corresponding value of time stamp of a to-be-decoded frame in the second odd-even number sequence, PTS2 is the time stamp of the to-be-decoded frame, and $\overline{\Delta PTS}$ is the video time stamp increment of the video data stream.

A second determination module 3043, which is used for determining whether the corresponding value of the time stamp of the to-be-output frame in the second odd-even number sequence can be divided by the adaptive threshold.

In this embodiment, if the corresponding value M of the time stamp of the to-be-output frame in the second odd-even number sequence cannot be divided by the adaptive threshold, the to-be-output frame meets the discard condition, i.e., the to-be-decoded frame corresponding to the to-be-output frame is the reference frame that meets the discard condition, and thus the to-be-output frame is discarded. Otherwise, the to-be-output frame does not meet the discard condition, i.e., the to-be-decoded frame corresponding to the to-be-output frame is the reference frame or non-reference frame that does not meet the discard condition, and thus the to-be-output frame is being output for subsequent display.

In the aforementioned step, the video time stamp increment $\overline{\Delta PTS}$ of the video data stream can be obtained using the obtaining module described above, or it can also be obtained using other devices well-known in the art.

Figure 11:
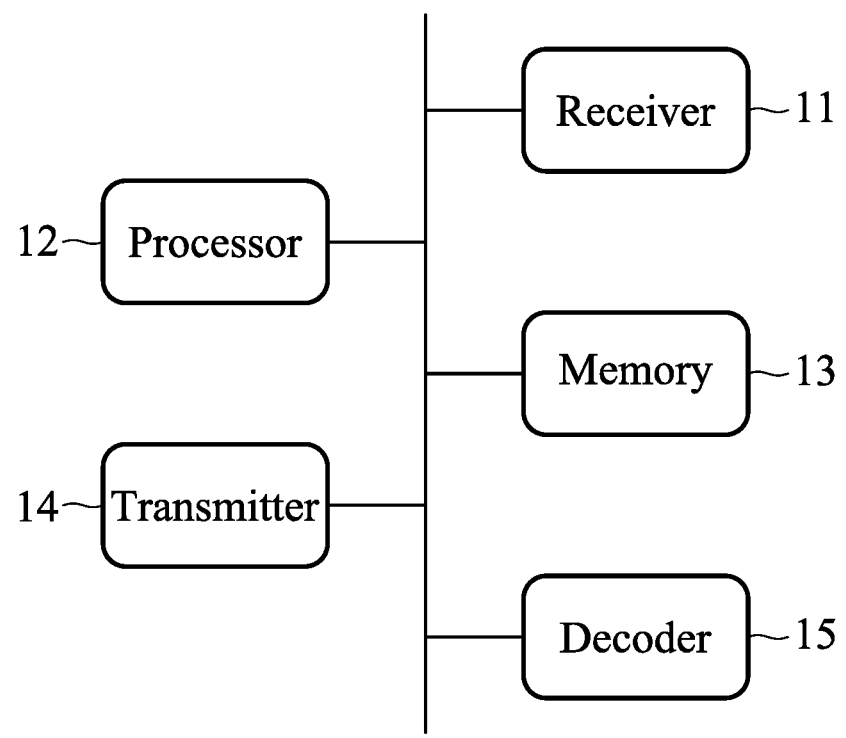
FIG. 11 is a schematic diagram illustrating a physical device structure of a control terminal for video playback according to an embodiment of the invention.

As shown in FIG. 11, FIG. 11 is a schematic diagram illustrating a physical device structure of a control terminal for video playback according to an embodiment of the invention. The control terminal in this embodiment can perform steps of FIG. 1 to FIG. 4 mentioned above, a detailed description can be found in related content described in the above process flow.

The control terminal comprising: a receiver 11, a processor 12, a memory 13 coupled to the processor 12, a transmitter 14 and a decoder 15.

The receiver 11 is used for receiving video data stream and storing the received video data stream in the memory 13 under control of the processor 12.

The memory 13 is used for storing the video data stream and parameter information carried in the video frames of the video data stream, including the time stamp, the frame rate and other information.

A processor 12 is used for retrieving the memory 13 and determining whether a to-be-decoded frame in the video data stream is a non-reference frame that meets a discard condition according to the time stamp of the to-be-decoded frame stored in the memory 13, discarding the to-be-decoded frame when the to-be-decoded frame is the non-reference frame that meets the discard condition, determining whether the to-be-output frame meets the discard condition according to the time stamp of the to-be-output frame, and discarding the to-be-output frame when the to-be-output frame meets the discard condition.

The transmitter 14 is used for transmitting the to-be-decoded frame which does not meet the discard condition to the decoder 15 for decoding.

The decoder 15 is used for decoding the to-be-decoded frame which does not meet the discard condition into a to-be-output frame.

This embodiment can also be applied in feedback devices that feeds back video display results. After a transmitter transmits video data streams that have completed frame drop operation to a display device, the feedback device will send video and audio synchronization status information to the processor. The processor then timely adjusts the discard condition according to the feedback information, thereby achieving video and audio synchronization.

The embodiments of the present invention have the following beneficial effects:

By partially discarding the non-reference frame part before decoding and partially discarding the reference frame after decoding of the present invention, equal time interval drop can be achieved; such that high-frame rate and high-data rate video data can then be played on a platform with insufficient decoding capability; the achievement of an equal time interval drop frame ensures the smooth play of video data on a low decoding capability platform after the drop.

Through the above described embodiments, one of ordinary skill in the art can understand that the present invention can be implemented by software and necessary hardware, of course, also can be implemented by hardware. Based on the above understanding, some aspect of the present invention can be stored in the form of software products in the storage medium to perform the methods described in the various embodiments of the present invention.

While the invention has been described by way of example and in terms of the preferred embodiments, it is to be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A video playback method, comprising:
receiving video data stream;
determining whether a to-be-decoded frame in the video data stream is a non-reference frame that meets a discard condition according to the time stamp of the to-be-decoded frame;
discarding the to-be-decoded frame when the to-be-decoded frame is a non-reference frame that meets the discard condition;
decoding the to-be-decoded frame into a to-be-output frame when the to-be-decoded frame is not a non-reference frame that meets the discard condition;
determining whether the to-be-output frame meets the discard condition according to the time stamp of the to-be-output frame;
discarding the to-be-output frame when the to-be-output frame meets the discard condition; and
outputting the to-be-output frame as an output frame when the to-be-output frame does not meet the discard condition, such that the time intervals of the time stamps of the sequentially output frames according to the display order are equal.

2. The video playback method according to claim 1, wherein the discard condition is determined by an adaptive threshold, and the video playback method further comprises:
adjusting the adaptive threshold based on a synchronization level of the output frame and the decoded audio frame.

3. The video playback method according to claim 1, wherein the discard condition is determined by an adaptive threshold, and the step of determining whether the to-be-decoded frame is a non-reference frame that meets the discard condition according to the time stamp of the to-be-decoded frame further comprises:
obtaining the time stamp of the to-be-decoded frame;
mapping the timestamp of the to-be-decoded frame to a first odd-even number sequence of which numbers are increased by equal interval according to the display order;
determining whether the to-be-decoded frame is a non-reference frame and whether the corresponding value of the time stamp of the to-be-decoded frame in the first odd-even number sequence can be divided by the adaptive threshold;
if the to-be-decoded frame is a non-reference frame and the corresponding value of the time stamp of the to-be-decoded frame in the first odd-even number sequence cannot be divided by the adaptive threshold, determining that the to-be-decoded frame is a non-reference frame that meets the discard condition;
otherwise, determining that the to-be-decoded frame is not a non-reference frame that meets the discard condition.

4. The video playback method according to claim 3, wherein the step of mapping the timestamp of the to-be-decoded frame to the first odd-even number sequence of which numbers are increased by equal interval according to the display order further comprises:
mapping the timestamp of the to-be-decoded frame to the first odd-even number sequence by the following equation:

$$N = \frac{PTS1}{\overline{\Delta PTS}},$$

wherein N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

5. The video playback method according to claim 3, wherein the step of determining whether the to-be-output frame meets the discard condition according to the time stamp of the to-be-output frame further comprises:
obtaining the time stamp of the to-be-output frame;
mapping the timestamp of the to-be-output frame to a second odd-even number sequence of which numbers are increased by equal interval according to the display order;
determining whether the corresponding value of the time stamp of the to-be-output frame in the second odd-even number sequence can be divided by the adaptive threshold;
if the corresponding value of the time stamp of the to-be-output frame in the second odd-even number sequence cannot be divided by the adaptive threshold, determining that the to-be-output frame meets the discard condition;
otherwise, determining that the to-be-output frame does not meet the discard condition.

6. The video playback method according to claim 5, wherein the step of mapping the timestamp of the to-be-output frame to the second odd-even number sequence of which numbers are increased by equal interval according to the display order further comprises:
mapping the timestamp of the to-be-output frame to the second odd-even number sequence by the following equation:

$$M = \frac{PTS2}{\overline{\Delta PTS}},$$

wherein M is the corresponding value of the time stamp of the to-be-output frame in the second odd-even number sequence, PTS2 is the time stamp of the to-be-output frame, and $\overline{\Delta PTS}$ is the video time stamp increment of the video data stream.

7. The video playback method according to claim 4, wherein before the step of determining whether the to-be-decoded frame in the video data stream is a non-reference frame that meets a discard condition according to the time stamp of the to-be-decoded frame, the video playback method further comprises:
  directly decoding the video data stream;
  performing difference value calculation on the time stamps of adjacent decoded frames which are being arranged according to the display order after decoding; and
  obtaining the video time stamp increment according to the difference value calculation result.

8. The video playback method according to claim 7, wherein the step of obtaining the video time stamp increment according to the difference value calculation result further comprises:
  calculating an average value of the multiple difference value calculation results and setting the average value to be the video time stamp increment.

9. The video playback method according to claim 2, wherein the step of adjusting the adaptive threshold based on the synchronization level of the output frame and the decoded audio frame further comprises:
  obtaining the time stamp of the output frame and the time stamp of the decoded audio frame;
  comparing a difference value between the time stamp of the output frame and the time stamp of the decoded audio frame with a preset time threshold;
  if the difference value obtained by subtracting the time stamp of the decoded audio frame from the time stamp of the output frame exceeds the preset time threshold, decreasing the step length of the adaptive threshold;
  if the difference value obtained by subtracting the time stamp of the output frame from the time stamp of the decoded audio frame exceeds the preset time threshold, increasing the step length of the adaptive threshold; and
  if an absolute value of a difference value between the time stamp of the decoded audio frame and the time stamp of the output frame is less than or equal to the preset time threshold, keeping the step length of the adaptive threshold unchanged.

10. A control terminal for video playback, comprising:
  a receiving unit, receiving video data stream;
  a pre-decoding determination unit, determining whether a to-be-decoded frame in the video data stream is a non-reference frame that meets a discard condition according to the time stamp of the to-be-decoded frame, wherein the pre-decoding determination unit discards the to-be-decoded frame when the to-be-decoded frame is a non-reference frame that meets the discard condition;
  a decoding unit, decoding the to-be-decoded frame into a to-be-output frame when the to-be-decoded frame is not a non-reference frame that meets the discard condition; and
  a post-decoding determination unit, determining whether the to-be-output frame meets the discard condition according to the time stamp of the to-be-output frame, discarding the to-be-output frame when the to-be-output frame meets the discard condition, and outputting the to-be-output frame as an output frame when the to-be-output frame does not meet the discard condition, such that the time intervals of the time stamps of the sequentially output frames according to the display order are equal.

11. The control terminal for video playback according to claim 10, wherein the discard condition is determined by an adaptive threshold, and the control terminal further comprises:
  an AV synchronization adjusting unit, adjusting the adaptive threshold based on a synchronization level of the output frame and the decoded audio frame.

12. The control terminal for video playback according to claim 10, wherein the pre-decoding determination unit further comprises:
  a first time stamp obtaining module, obtaining the time stamp of the to-be-decoded frame;
  a first mapping module, mapping the timestamp of the to-be-decoded frame to a first odd-even number sequence of which numbers are increased by equal interval according to the display order; and
  a first determination module, determining whether the to-be-decoded frame is a non-reference frame and whether the corresponding value of the time stamp of the to-be-decoded frame in the first odd-even number sequence can be divided by the adaptive threshold; if the to-be-decoded frame is a non-reference frame and the corresponding value of the time stamp of the to-be-decoded frame in the first odd-even number sequence cannot be divided by the adaptive threshold, determining that the to-be-decoded frame is a non-reference frame that meets the discard condition; otherwise, determining that the to-be-decoded frame is not a non-reference frame that meets the discard condition.

13. The control terminal for video playback according to claim 12, wherein the first mapping module further maps the timestamp of the to-be-decoded frame to the first odd-even number sequence by the following equation:

$$N = \frac{PTS1}{\overline{\Delta PTS}},$$

wherein N is the corresponding value of the time stamp of the to-be-decoded frame in the first odd-even number sequence, PTS1 is the time stamp of the to-be-decoded frame, and $\overline{\Delta PTS}$ is the video time stamp increment of the video data stream.

14. The control terminal for video playback according to claim 13, wherein the control terminal further comprises a time stamp increment obtaining module for performing difference value calculation on the time stamps of adjacent decoded frames which are generated by the decoding unit through directly decoding the video data stream and being adjacently arranged according to the display order after the decoding, and obtaining the video time stamp increment according to the difference value calculation result.

15. The control terminal for video playback according to claim 14, wherein the time stamp increment obtaining module further calculates an average value of the multiple difference value calculation results and sets the average value to be the video time stamp increment.

16. The control terminal for video playback according to claim 12, wherein the post-decoding determination unit further comprises:
  a second time stamp obtaining module, obtaining the time stamp of the to-be-output frame;
  a second mapping module, mapping the timestamp of the to-be-output frame to a second odd-even number sequence of which numbers are increased by equal interval according to the display order; and a second determination module, determining whether the corresponding value of the time stamp of the to-be-output frame in the second odd-even number sequence can be divided by the adaptive threshold; if the corresponding value of the time stamp of the to-be-output frame in the second odd-even number sequence cannot be divided by the adaptive threshold, determining that the to-be-output frame meets the discard condition; otherwise, determining that the to-be-output frame does not meet the discard condition.

17. The control terminal for video playback according to claim 16, wherein the second mapping module further maps the timestamp of the to-be-output frame to the second odd-even number sequence by the following equation:

$$M = \frac{PTS2}{\overline{\Delta PTS}},$$

wherein M is the corresponding value of the time stamp of the to-be-output frame in the second odd-even number sequence, PTS2 is the time stamp of the to-be-output frame, and $\overline{\Delta PTS}$ is the video time stamp increment of the video data stream.

18. The control terminal for video playback according to claim 17, wherein the control terminal further comprises a time stamp increment obtaining module for performing difference value calculation on the time stamps of adjacent decoded frames which are generated by the decoding unit through directly decoding the video data stream and being adjacently arranged according to the display order after the decoding, and obtaining the video time stamp increment according to the difference value calculation result.

19. The control terminal for video playback according to claim 18, wherein the time stamp increment obtaining module further calculates an average value of the multiple difference value calculation results and sets the average value to be the video time stamp increment.

20. The control terminal for video playback according to claim 11, wherein the AV synchronization adjusting unit further obtains the time stamp of the output frame and the time stamp of the decoded audio frame and compares a difference value between the time stamp of the output frame and the time stamp of the decoded audio frame with a preset time threshold; if the difference value obtained by subtracting the time stamp of the decoded audio frame from the time stamp of the output frame exceeds the preset time threshold, the AV synchronization adjusting unit decreases the step length of the adaptive threshold; if the difference value obtained by subtracting the time stamp of the output frame from the time stamp of the decoded audio frame exceeds the preset time threshold, the AV synchronization adjusting unit increases the step length of the adaptive threshold; and if an absolute value of a difference value between the time stamp of the decoded audio frame and the time stamp of the output frame is less than or equal to the preset time threshold, the AV synchronization adjusting unit keeps the step length of the adaptive threshold unchanged.

* * * * *